United States Patent Office 2,855,320
Patented Oct. 7, 1958

2,855,320

COMPOSITION OF MATTER AND METHOD OF MAKING THE SAME

Arthur E. Gabriel, Montclair, N. J., assignor to Carr, Adams & Collier Company, a corporation of Iowa No Drawing. Application May 4, 1955
Serial No. 506,091

22 Claims. (Cl. 106—163)

This invention relates to methods of making a lignocellulose product and the products resulting therefrom.

One of the objects of this invention is to provide an improved method of making a lignocellulose product consisting essentially of intimately mixing particles of lignocellulose material with at least about 0.5% by weight of a member of the class consisting of cobalt, nickel, iron, lead, copper and zinc carbonates, silica gel, iron sulfate and silica gel, iron sulfate and calcium carbonate and lignin, copper carbonate and silica gel, copper carbonate and alumina, copper carbonate and sulfur, and mixtures thereof, and heating said mixture under pressure for a time and at a temperature sufficient to combine chemically at least a major portion of said member with said lignocellulose.

Another object of the invention is to provide an improved method of making a lignocellulose product consisting essentially of intimately mixing particles of lignocellulose material with from about 0.5–20% by weight of a member of the class consisting of cobalt, nickel, iron, lead, copper and zinc carbonates, silica gel, iron sulfate and silica gel, iron sulfate and calcium carbonate and lignin, copper carbonate and silica gel, copper carbonate and alumina, copper carbonate and sulfur, and mixtures thereof, and heating said mixture under pressure for a time of between about 0.1–60 minutes and a temperature of about 400–700° F. during at least a portion of the heating period to combine chemically at least a major portion of said member with said lignocellulose.

Other objects and advantages of the invention will be readily apparent from the following detailed description of the invention.

In general, the method of this invention involves mixing finely divided lignocellulose and a small amount of a member of the class consisting of cobalt, nickel, iron, lead, copper and zinc carbonates, silica gel, iron sulfate and silica gel, iron sulfate and calcium carbonate and lignin, copper carbonate and silica gel, copper carbonate and alumina, copper carbonate and sulfur, and mixtures thereof. The materials are mixed to form a substantially homogeneous mixture which is then heated to combine chemically at least a portion of the member of the above class that is employed in the particular process and the lignocellulose. Where the mixture is given a preliminary heat treatment, the product is a thermoplastic molding composition capable of being molded under pressure and heat to produce a product having the shape of the mold cavity.

The preheat product may be stored if desired and then later molded under heat and pressure in a mold of suitable shape to produce articles as described above.

It has long been known that lignocellulose particles such as finely divided wood can be compressed into a coherent mass by heat and pressure as the heat apparently causes the lignin to become plastic and serve as a binder. The temperatures required, however, are so high that they cause rapid and almost spontaneous decomposition of the lignocellulose so that this method is not practical. The methods of this invention where a material is employed that is either cobalt carbonate, nickel carbonate, lead carbonate, iron carbonate, copper carbonate, zinc carbonate, silica gel, a combination of iron sulfate and silica gel, a combination of iron sulfate, calcium carbonate and lignin, a mixture of copper carbonate and silica gel, a mixture of copper carbonate and alumina, a combination of copper carbonate and sulfur, or mixtures of two or more of these reactants, such decomposition is greatly minimized so that temperatures may be employed to produce a plastic mass that can easily be molded under pressure. The lignocellulose used is preferably relatively dry and in the preferred process does not contain over about 30% of water by weight of the dry lignocellulose, which is approximately the fiber saturation point.

Any of the above chemical compounds and mixtures may be used as desired. However, the preferred compounds are copper carbonate, iron carbonate, a mixture of iron sulfate and silica gel, a mixture of iron sulfate, calcium carbonate and lignin, and nickel carbonate.

The lignocellulose that may be used includes wood and lignocellulosic vegetable materials as well as partially hydrolyzed or pulped lignocellulose. In order to insure intimate contact of the materials, the lignocellulose is preferably finely divided, with the particles preferably being not coarser than an average of about 20 mesh although an average of 50 mesh particles produces a smoother, stronger and finer-grained final product.

The amount of reactant and reactant mixture used to make the products of this invention is preferably not less than about 0.5% by weight of the reacting mixture. The preferred proportions are between about 0.5 and 20% by weight. Where the reactant is a mixture of compounds such as a mixture of iron sulfate and silica gel, a mixture of iron sulfate, calcium carbonate and lignin, a mixture of copper carbonate and silica gel, a mixture of copper carbonate and alumina, or a mixture of copper carbonate and sulfur, the total amount of reactants in each mixture should preferably be not less than about 0.5%. The minimum amount of any ingredient of a mixture is preferably not less than about 0.3%.

The particle size of the chemical compound or reactant ingredient or mixture should be small in order to insure even distribution of the material throughout the mass and to bring the material into intimate contact with the particles of lignocellulose. In general, this particle size is preferably not coarser than about 50 to 100 mesh, and is preferably not finer than 200 or 300 mesh. This means that the material used has an average particle size passing through standard screens of these sizes.

In preparing the products of this invention, the lignocellulose material and the reactant or reactant mixture are intimately mixed to produce a substantially homogeneous mass. This mixture is then preferably compacted so that during the subsequent heating step relatively good heat transfer may be achieved. The mixture may then be given an initial heating or preheat, either under no pressure or light pressure, in order to combine chemically a portion of the reactant with the lignocellulose material. This initial heat treatment where employed makes the resulting product relatively thermoplastic for subsequent molding operations. The preheat temperature is relatively high in order to drive off vapors and to cause the chemical combination of at least a portion of the chemical compound or mixture. However, the preheat temperature is maintained low enough so that excessive charring is avoided and high boiling compounds are not lost.

The product of this preheat treatment is a molding composition that is capable of being molded under pressure and heat in a mold of desired shape to produce molded products. This molding composition is a mixture of substantially dry lignocellulose with some chemically reacted chemical reactant compound substantially uniformly distributed therethrough. In the preferred preheat process, the temperature is maintained between about 400 to 700° F. and this temperature maintained for about 0.1 to 15 minutes. In general, a temperature of about 500 to 550° F. has been found to be highly satisfactory.

The thermoplastic molding composition prepared as described may be molded in a heated pressure mold of the desired shape to produce molded products. In this step the preheat composition is compressed for a relatively brief period at a desired pressure and heated at a temperature which may be somewhat lower than the preheat temperature if desired, but which may be substantially the same as the preheat temperature, if desired. In the preferred method this molding temperature will be between about 250° to 700° F. The time of molding is such that the total time, including the preheat time if a preheat is used, is between about 0.1 to 60 minutes.

The pressure that is employed is governed by the desired characteristics in the final product. In general, this pressure will be between about 50 and 5,000 pounds per square inch, although higher and lower pressures may be employed, depending upon the desired characteristics of the final product. At the lower pressures, the product will be found to be relatively low in density and relatively porous. At the higher pressures the product is hard, dense and compact and more nearly resembles molded thermosetting resins.

In the final molding operation the pressure is maintained during the heating operation for a time sufficient to set the mixture. As is pointed out above, the total heating, including the preheat and the final molding operation, is preferably between about 0.1 to 60 minutes.

In the following table there is set out a number of examples of producing products according to this invention. The first column of the table sets out the example number. The second column identifies the particular activator or chemical compound or mixture employed, while the third column sets out the amount of activator and percentage by weight. The fourth column gives the temperature of both the preheat and the final molding, while the fifth column gives the preheat time in minutes, except where otherwise indicated, for the preheating step. Where no preheat is used in any example, this time is indicated as "0." The final column gives the molding time in minutes in the final molding step.

In each example, finely divided Ponderosa pine wood having a maximum particle size of about 50 mesh and substantially bone dry was mixed with the stated amount of the specified activator. The wood and the activator were intimately mixed to produce a substantially homogeneous product. A mass of this mixture about 1¾ inches thick was then partially compacted into a square mold frame about one inch deep. The mixture rested on a fine mesh wire screen which was supported on a metal plate. The plate, screen and frame had been preheated to the specified temperature. A preheated metal top plate and block were then placed on the mold with the mixture therein placed on a heated platen of a press. The mixture within the mold was compacted to a pressure of about 400 pounds per square inch in order to increase the efficiency of heat transfer through the mass and this pressure then removed. The heated platen was maintained at a temperature such as to heat the mixture to the specified temperature and this temperature was maintained for the specified preheat time. The screen aided in venting the gases given off during this preheat.

At the end of the preheat period, the partially reacted mass was compacted between the heated platens of the press for the specified molding time at the particular temperature given. At the end of this time period, the pressure was released and the finished product removed from the mold.

In those instances where no preheat was employed, the mixture of wood and activator was placed directly in the press and heated at the specified temperature and at a pressure of 700 pounds per square inch for the molding time given in the last column of the table. The molding time is in minutes unless otherwise stated.

| Ex. No. | Activator | Percent by wt. | Temp., °F. | Preheat time (min.) | Molding time (min.) |
|---|---|---|---|---|---|
| 1 | FeCO₃ | 10 | 500 | 5 | 1.5 sec. |
| 2 | FeCO₃ | 10 | 500 | 0 | 5.0 |
| 3 | FeCO₃ | 10 | 500 | 12 | 1.5 |
| 4 | FeCO₃ | 10 | 550 | 5 | 1.5 |
| 5 | FeCO₃ | 10 | 550 | 0 | 3.0 |
| 6 | FeCO₃ | 10 | 550 | 12 | 1.5 |
| 7 | FeSO₄·7H₂O / Silica Gel | 10 / 5 | 550 | 5 | 5.0 |
| 8 | FeSO₄·7H₂O / Silica Gel | 10 / 5 | 550 | 5 | 2.45 sec. |
| 9 | FeSO₄·7H₂O / Silica Gel | 10 / 5 | 550 | 5 | 5.0 |
| 10 | FeSO₄·7H₂O / Silica Gel | 10 / 5 | 550 | 5 | 7.0 |
| 11 | FeSO₄·7H₂O / Silica Gel | 10 / 5 | 550 | 0 | 6.0 |
| 12 | Lignin / FeSO₄ / CaCO₃ | 6 / 8 / 4 | 500 | 0 | 3.0 |
| 13 | Lignin / FeSO₄ / CaCO₃ | 6 / 8 / 4 | 500 | 5 | 3.0 |
| 14 | Lignin / FeSO₄ / CaCO₃ | 6 / 8 / 4 | 540 | 0 | 3.0 |
| 15 | Lignin / FeS₄ / CaCO₃ | 6 / 8 / 4 | 540 | 5 | 3.0 |
| 16 | FeSO₄ / CaCO₃ / Lignin | 5 / 2 / 6 | 500 | 0 | 3.0 |
| 17 | FeSO₄ / CaCO₃ / Lignin | 5 / 2 / 6 | 500 | 5 | 3.0 |
| 18 | FeSO₄ / CaCO₃ / Lignin | 5 / 2 / 6 | 500 | 5 | 5.0 |
| 19 | FeSO₄ / CaCO₃ / Lignin | 10 / 5 / 6 | 500 | 0 | 1.5 |
| 20 | FeSO₄ / CaCO₃ / Lignin | 10 / 5 / 6 | 500 | 5 | 3.0 |
| 21 | FeSO₄ / CaCO₃ / Lignin | 10 / 5 / 6 | 500 | 5 | 5.0 |
| 22 | FeSO₄ / CaCO₃ / Lignin | 10 / 5 / 6 | 500 | 5 | 10.0 |
| 23 | FeSO₄ / CaCO₃ / Lignin | 10 / 5 / 6 | 500 | 5 | 7.0 |
| 24 | FeSO₄ / CaCO₃ / Lignin | 10 / 5 / 6 | 500 | 0 | 5.0 |
| 25 | FeSO₄ / CaCO₃ / Lignin | 10 / 3.5 / 6 | 500 | 5 | 5.0 |
| 26 | FeSO₄ / CaCO₃ / Lignin | 10 / 3.5 / 6 | 500 | 5 | 7.0 |
| 27 | FeSO₄ / CaCO₃ / Lignin | 10 / 3.5 / 6 | 500 | 5 | 4.0 |
| 28 | 325 mesh Silica Gel | 15 | 550 | 8 | 1.5 |
| 29 | 325 mesh Silica Gel | 5 | 550 | 0 | 3.0 |
| 30 | 325 mesh Silica Gel | 5 | 550 | 0 | 6.0 |
| 31 | 325 mesh Silica Gel | 5 | 550 | 0 | 7.0 |
| 32 | 325 mesh Silica Gel | 5 | 550 | 0 | 8.0 |
| 33 | 325 mesh Silica Gel | 5 | 550 | 0 | 7.5 sec. |
| 34 | Silica Gel | 1 | 550 | 5 | 3.0 |
| 35 | Silica Gel (80–200 mesh) | 5 | 550 | 5 | 3.0 |
| 36 | NiCO₃ | 10 | 550 | 5 | 1.5 |
| 37 | NiCO₃ | 10 | 550 | 0 | 3.0 |
| 38 | NiCO₃ | 10 | 550 | 0 | 5.0 |
| 39 | NiCO₃ | 10 | 550 | 0 | 7.0 |
| 40 | NiCO₃ | 10 | 550 | 5 | 3.0 |
| 41 | CuCO₃ | 10 | 500 | 5 | 1.5 |
| 42 | CuCO₃ | 10 | 500 | 0 | 5.0 |
| 43 | CuCO₃ | 10 | 500 | 12 | 1.5 |
| 44 | CuCO₃ | 10 | 550 | 0 | 3.0 |
| 45 | CuCO₃ | 10 | 550 | 5 | 2.0 |
| 46 | CuCO₃ | 10 | 550 | 8 | 1.5 |
| 47 | CuCO₃ | 10 | 550 | 5 | 3.0 |

| Ex. No. | Activator | Percent by wt. | Temp., °F. | Preheat time (min.) | Molding time (min.) |
|---|---|---|---|---|---|
| 48 | CuCO₃ / Silica Gel | 10 / 5 | 550 | 0 | 3.0 |
| 49 | CuCO₃ / Silica Gel | 10 / 5 | 550 | 0 | 4.0 |
| 50 | CuCO₃ / Silica Gel | 10 / 5 | 550 | 0 | 6.0 |
| 51 | CuCO₃ / Silica Gel | 10 / 5 | 550 | 0 | 10.0 |
| 52 | CuCO₃ | 5 | 550 | 5 | 3.0 |
| 53 | CuCO₃ | 10 | 550 | 5 | 1.5 |
| 54 | CuCO₃ | 5 | 550 | 5 | 1.5 |
| 55 | CuCO₃ | 5 | 550 | 8 | 1.5 |
| 56 | CuCO₃ | 10 | 550 | 5 | 2.0 |
| 57 | CuCO₃ | 5 | 550 | 5 | 2.0 |
| 58 | CuCO₃ / Silica Gel | 10 / 5 | 550 | 0 | 14.0 |
| 59 | CuCO₃ / Silica Gel | 10 / 5 | 550 | 5 | 3.0 |
| 60 | CuCO₃ / Alumina | 10 / 5 | 550 | 5 | 1.5 |
| 61 | CuCO₃ / Alumina | 10 / 5 | 550 | 5 | 3.0 |
| 62 | CuCO₃ / Alumina | 10 / 5 | 550 | 0 | 3.0 |
| 63 | CuCO₃ / Alumina | 10 / 5 | 550 | 0 | 5.20 sec. |
| 64 | CuCO₃ | 10 | 540 | 5 | 3.0 |
| 65 | CuCO₃ | 10 | 540 | 5 | 5.0 |
| 66 | CuCO₃ | 10 | 540 | 5 | 7.0 |
| 67 | CuCO₃ | 10 | 540 | 5 | 4.0 |
| 68 | CuCO₃ / Sulfur | 3 / 1 | 500 | 0 | 3.0 |
| 69 | CuCO₃ / Sulfur | 3 / 1 | 500 | 5 | 3.0 |
| 70 | CuCO₃ / Sulfur | 3 / 1 | 500 | 5 | 5.0 |
| 71 | CuCO₃ / Sulfur | 3 / 1 | 500 | 5 | 6.0 |
| 72 | CuCO₃ / Sulfur | 3 / 1 | 500 | 3 | 8.0 |
| 73 | CuCO₃ / Sulfur | 3 / 1 | 500 | 3 | 7.0 |
| 74 | CuCO₃ / Sulfur | 2 / 1 | 500 | 5 | 5.0 |
| 75 | CuCO₃ / Sulfur | 2 / 1 | 500 | 3 | 7.0 |
| 76 | CuCO₃ / Sulfur | 2 / 1 | 500 | 3 | 9.0 |
| 77 | CuCO₃ / Sulfur | 2 / 1 | 500 | 4 | 6.0 |
| 78 | CuCO₃ / Sulfur | 2 / 1 | 500 | 4 | 8.0 |
| 79 | CuCO₃ / Sulfur | 1 / 2 | 500 | 0 | 5.0 |
| 80 | CuCO₃ / Sulfur | 1 / 2 | 500 | 5 | 5.0 |
| 81 | CuCO₃ / Sulfur | 1 / 2 | 500 | 3 | 7.0 |
| 82 | CuCO₃ / Sulfur | 1 / 2 | 500 | 4 | 6.0 |
| 83 | CuCO₃ / Sulfur | 1 / 3 | 500 | 5 | 5.0 |
| 84 | CuCO₃ / Sulfur | 1 / 3 | 500 | 5 | 7.0 |
| 85 | CuCO₃ / Sulfur | 1 / 3 | 500 | 4 | 6.0 |
| 86 | CuCO₃ / Sulfur | 1 / 3 | 500 | 3 | 7.0 |
| 87 | CuCO₃ / Sulfur | 2 / 2 | 500 | 5 | 7.0 |
| 88 | CuCO₃ / Sulfur | 2 / 2 | 500 | 5 | 10.0 |
| 89 | CuCO₃ / Sulfur | 2 / 2 | 500 | 4 | 11.0 |
| 90 | CuCO₃ / Sulfur | 2 / 2 | 500 | 4 | 9.0 |
| 91 | CuCO₃ / Sulfur | 2 / 2 | 500 | 3 | 10.0 |
| 92 | CuCO₃ / Sulfur | 2 / 2 | 500 | 3 | 8.0 |
| 93 | CuCO₃ / Sulfur | 2 / 2 | 500 | 3 | 6.0 |
| 94 | CuCO₃ | 10 | 500 | 5 | 5.0 |
| 95 | CuCO₃ | 10 | 500 | 5 | 8.0 |
| 96 | CuCO₃ | 10 | 500 | 5 | 10.0 |
| 97 | CuCO₃ | 10 | 500 | 5 | 15.0 |
| 98 | CuCO₃ / Sulfur | 3 / 2 | 500 | 5 | 4.0 |
| 99 | CuCO₃ / Sulfur | 2 / 3 | 500 | 5 | 3.0 |
| 100 | CuCO₃ / Sulfur | 2 / 3 | 500 | 5 | 4.0 |
| 101 | CuCO₃ / Sulfur | 3 / 3 | 500 | 5 | 5.0 |
| 102 | CuCO₃ / Sulfur | 3 / 3 | 500 | 5 | 7.0 |
| 103 | CuCO₃ / Sulfur | 3 / 3 | 500 | 5 | 9.0 |
| 104 | CuCO₃ / Sulfur | 3 / 3 | 500 | 5 | 10.0 |
| 105 | CuCO₃ | 8 | 500 | 5 | 10.0 |
| 106 | CuCO₃ | 8 | 500 | 5 | 15.0 |
| 107 | CuCO₃ | 6 | 500 | 5 | 10.0 |
| 108 | CuCO₃ | 3 | 500 | 5 | 15.0 |
| 109 | CuCO₃ | 3 | 500 | 5 | 13.0 |
| 110 | CuCO₃ | 0.5 | 500 | 5 | 10.0 |
| 111 | PbCO₃ | 10 | 550 | 5 | 1.5 |
| 112 | PbCO₃ | 10 | 550 | 0 | 2.5 |
| 113 | PbCO₃ | 10 | 550 | 0 | 3.0 |
| 114 | PbCO₃ | 10 | 550 | 12 | 1.5 |
| 115 | PbCO₃ | 10 | 550 | 5 | 1.5 |
| 116 | PbCO₃ | 10 | 550 | 5 | 3.0 |
| 117 | ZnCO₃ | 10 | 500 | 5 | 1.5 |
| 118 | ZnCO₃ | 10 | 500 | 12 | 1.5 |
| 119 | ZnCO₃ | 10 | 500 | 0 | 5.0 |
| 120 | ZnCO₃ | 10 | 550 | 5 | 1.5 |
| 121 | ZnCO₃ | 10 | 550 | 0 | 2.0 |
| 122 | ZnCO₃ | 10 | 550 | 0 | 4.0 |
| 123 | CoCO₃ | 10 | 500 | 5 | 1.5 |
| 124 | CoCO₃ | 10 | 500 | 12 | 1.5 |
| 125 | CoCO₃ | 10 | 500 | 0 | 5.0 |
| 126 | CoCO₃ | 10 | 550 | 5 | 1.5 |
| 127 | CoCO₃ | 10 | 550 | 0 | 3.0 |
| 128 | CoCO₃ | 10 | 550 | 0 | 4.0 |

Having described my invention as related to the embodiments set out herein, it is my intention that the invention be not limited by any of the details of description unless otherwise specified, but rather be construed broadly within its spirit and scope as set out in the accompanying claims.

I claim:

1. The method of making a lignocellulose product, consisting essentially of: intimately mixing particles of lignocellulose with about 0.5–20% by weight of a member of the class consisting of cobalt carbonate, nickel carbonate, iron carbonate, lead carbonate, copper carbonate, zinc carbonate, and mixtures thereof; and heating the resulting composition under pressure for a time and at a temperature sufficient to combine chemically a major portion of said member with said lignocellulose.

2. The method of making a lignocellulose product, consisting essentially of: intimately mixing particles of lignocellulose with about 0.5–20% by weight of a member of the class consisting of cobalt carbonate, nickel carbonate, iron carbonate, lead carbonate, copper carbonate, zinc carbonate, and mixtures thereof; and heating the resulting composition under pressure for from about 0.1–60 minutes at a temperature of from about 400–700° F.

3. The method of claim 2 wherein said member is cobalt carbonate.

4. The method of claim 2 wherein said member is nickel carbonate.

5. The method of claim 2 wherein said member is iron carbonate.

6. The method of claim 2 wherein said member is lead carbonate.

7. The method of claim 2 wherein said member is copper carbonate.

8. The thermal reaction product of finely divided lignocellulose and about 0.5–20% by weight of a member of the class consisting of cobalt carbonate, nickel carbonate, iron carbonate, lead carbonate, copper carbonate, zinc carbonate, and mixtures thereof that has been heated at a temperature of from about 400–700° F. for from about 0.1–60 minutes.

9. The reaction product of claim 8 wherein said member is cobalt carbonate.

10. The reaction product of claim 8 wherein said member is nickel carbonate.

11. The reaction product of claim 8 wherein said member is iron carbonate.

12. The reaction product of claim 8 wherein said member is lead carbonate.

13. The reaction product of claim 8 wherein said member is copper carbonate.

14. The method of making a lignocellulose product, consisting essentially of: intimately mixing particles of lignocellulose with about 0.5–20% by weight of copper carbonate plus about 5% by weight of silica gel; and heating the resulting composition under pressure for a time and at a temperature sufficient to combine chemically a major portion of said member with said lignocellulose.

15. The method of making a lignocellulose product, consisting essentially of: intimately mixing particles of lignocellulose with about 0.5–20% by weight of copper carbonate plus about 5% by weight of alumina; and heating the resulting composition under pressure for a time and at a temperature sufficient to combine chemically a major portion of said member with said lignocellulose.

16. The method of making a lignocellulose product, consisting essentially of: intimately mixing particles of lignocellulose with about 0.5–20% by weight of copper carbonate plus about 1–3% by weight of sulfur; and heating the resulting composition under pressure for a time and at a temperature sufficient to combine chemically a major portion of said member with said lignocellulose.

17. The method of making a lignocellulose product, consisting essentially of: intimately mixing particles of lignocellulose with about 0.5–20% by weight of copper carbonate plus about 5% by weight of silica gel; and heating the resulting composition under pressure for from about 0.1–60 minutes at a temperature of from about 400–700° F.

18. The method of making a lignocellulose product, consisting essentially of: intimately mixing particles of lignocellulose with about 0.5–20% by weight of copper carbonate plus about 5% by weight of alumina; and heating the resulting composition under pressure for from about 0.1–60 minutes at a temperature of from about 400–700° F.

19. The method of making a lignocellulose product, consisting essentially of: intimately mixing particles of lignocellulose with about 0.5–20% by weight of copper carbonate plus about 1–3% by weight of sulfur; and heating the resulting composition under pressure for from about 0.1–60 minutes at a temperature of from about 400–700° F.

20. The thermal reaction product of finely divided lignocellulose and about 0.5–20% by weight of copper carbonate plus about 5% by weight of silica gel that has been heated at a temperature of from about 400–700° F. for from about 0.1–60 minutes.

21. The thermal reaction product of finely divided lignocellulose and about 0.5–20% by weight of copper carbonate plus about 5% by weight of alumina that has been heated at a temperature of from about 400–700° F. for from about 0.1–60 minutes.

22. The thermal reaction product of finely divided lignocellulose and about 0.5–20% by weight of copper carbonate plus about 1–3% by weight of sulfur that has been heated at a temperature of from about 400–700° F. for from about 0.1–60 minutes.

References Cited in the file of this patent

UNITED STATES PATENTS

| | | |
|---|---|---|
| 504,988 | Mellinger | Sept. 12, 1893 |
| 1,331,519 | Motta | Feb. 24, 1920 |
| 1,392,127 | Erlund | Sept. 27, 1921 |
| 2,388,487 | Linzell | Nov. 6, 1945 |
| 2,486,601 | Irum | Nov. 1, 1949 |
| 2,583,548 | Craig | Jan. 29, 1952 |
| 2,631,082 | Noyes et al. | Mar. 10, 1953 |
| 2,692,206 | Orthmer | Oct. 19, 1954 |
| 2,779,683 | Gill | Jan. 29, 1957 |

FOREIGN PATENTS

| | | |
|---|---|---|
| 477,493 | France | Oct. 22, 1915 |
| 654,433 | Germany | Dec. 20, 1937 |